United States Patent [19]

Noveroske

[11] 3,856,502
[45] Dec. 24, 1974

[54] METHOD FOR STIMULATION OF PLANT GROWTH

[75] Inventor: Robert L. Noveroske, Midland, Mich.

[73] Assignee: The Dow Chemical Company, Midland, Mich.

[22] Filed: Aug. 9, 1973

[21] Appl. No.: 386,928

[52] U.S. Cl. .......................... 71/77, 71/94, 424/263
[51] Int. Cl. .............................................. A01n 9/22
[58] Field of Search ................... 71/77, 94; 424/263

[56] References Cited
UNITED STATES PATENTS

| | | | |
|---|---|---|---|
| 3,651,066 | 3/1972 | Domenico | 71/94 |
| 3,711,486 | 1/1973 | Torba | 71/94 |
| 3,769,291 | 10/1973 | Parker et al. | 71/94 |

*Primary Examiner*—Lewis Gotts
*Assistant Examiner*—Catherine L. Mills
*Attorney, Agent, or Firm*—S. Preston Jones

[57] ABSTRACT

Method for the stimulation of plant growth in the presence or absence of fungal organisms which attack the foliar parts of plants which comprises applying to plants or plant parts, a fungicidally effective growth stimulating amount of a composition comprising 2,3,5-trichloro-6-(methyl-sulfonyl)-4-cyanopyridine as the active growth stimulant, in intimate admixture with an inert carrier therefor.

5 Claims, No Drawings

3,856,502

METHOD FOR STIMULATION OF PLANT GROWTH

SUMMARY OF THE INVENTION

The present invention is directed to a method for the stimulation of plant growth in the presence or absence of fungal organisms which attack the foliar parts of plants which comprises applying to plants or plant parts, a fungicidally effective growth stimulating amount of a composition comprising 2,3,5-trichloro-6-(methylsulfonyl)-4-cyanopyridine as the active growth stimulant, in intimate admixture with an inert carrier therefor.

In the present specification and claims, the term "plant part" is employed to designate plant seeds and the aboveground portion i.e., the crown, stalk, stem, foliage or leaf system, fruit or flower.

The present invention relates to plant husbandry and the raising of crop plants; and is particularly concerned with an agronomic practice for promoting the growth of plants.

A number of plant growth promoters have been found, but there has been little use of most of these materials since many of the known growth promoters are highly phytotoxic and have little latitude in the number of dilutions between phytotoxicity of growth promotion. Further, many of them are plant specific making them useful with only a very few different plants.

In addition, many of the prior art compounds which have been found to have growth promoting activity have not been found to maintain this activity with plants subjected to high foliar fungal attack (high fungal pressure) and are therefore normally employed only in fungal free environments.

It has now been found that 2,3,5-trichloro-6-(methylsulfonyl)-4-cyanopyridine has a high degree of plant stimulation activity and a low phytotoxicity potential. In addition, this compound has been found to maintain this activity both in the presence or absence of plant attacking fungal organisms providing additionally, control against the genera Helminthosporium, Botrytis, Venturia, Phytophthora, Pseudoperonospora, Plasmopara and others. Further, this compound gives positive growth responses on a wide variety of agronomic crops among both narrow-leaf and broad-leaf plants.

The present invention is applicable to the cultivation and growing of a number of crops including, among others, rice, corn, wheat, soybeans, cotton, peas, beets, beans, grapes, potatoes, and cucumbers. This invention provides a method which enhances the growth of crops both in terms of the number of plants which can be grown per acre and/or the yield of the individual plants. In addition, seeds treated by the present method have decreased emergence time and the plants have a more rapid growth and earlier maturation than would be otherwise obtained in the absence of this treatment.

In carrying out the method of the present invention, the plants can be contacted with an effective growth stimulating amount of 2,3,5-trichloro-6-(methylsulfonyl)-4-cyanopyridine at any stage of plant development.

Generally, in the actual practice of the method of the present invention, a growth stimulating amount of 2,3,5-trichloro-6-(methylsulfonyl)-4-cyanopyridine can be applied to the plant or plant part by such convenient procedures as seed treatment, or foliar treatment.

In the present specification and claims, the term "growth stimulating amount" is employed to designate the use of a sufficient amount of the active compound to give a positive growth response from the plants and less than the amount necessary to retard normal plant growth.

The exact dosage of the active compound employed depends upon the specific plant species being treated, hardiness of the plant, the stage of growth at which treatment is made, the soil type and compactness, the depth at which the compound is distributed in the soil and the climatic conditions such as temperature, wind and especially rainfall, and the mode of application. More specifically, when the compound is applied to seeds, the active compound is applied at a rate of from about one-eighth ounce to about 8 ounces per hundred pounds of seeds. For foliar applications, the active compound is applied at a rate of from about one-half ounce to about 4 pounds of active compound per acre.

The method of the present invention may be carried out by treating the plants or plant parts with the unmodified pyridine compound. However, said method also embraces the employment of liquid, wettable powder or dust compositions containing this compound. In such usage, the compound may be modified with one or more of a plurality of additaments microbiocide or fungicide adjuvants, including solvents or other liquid carriers, surface-active dispersing agents and carriers such as finely divided inert solids. Depending on the concentration of toxicant, such augmented compositions are adapted to be applied directly to said plants or plant parts or employed as concentrates and subsequently diluted with additional adjuvant or carrier to produce the ultimate treating compositions.

The exact concentration of the 2,3,5-trichloro-6-(methylsulfonyl)-4-cyanopyridine compound to be employed in the treating composition may vary provided the required fungicidal and growth promoting dosage of the active compound is applied to the plant or plant part. The concentration in liquid and wettable powder compositions employed to supply the desired dosage generally is from about 0.1 to 90 pecent by weight. In dusts, the concentration of the effective agent may be from about 1 to 20 percent by weight. In compositions to be employed as concentrates, the active agent may be present in a concentration of from about 5 to 98 percent by weight.

In the preparation of dust or wettable powder compositions, the active stimulant compound can be compounded with any of the finely divided inert solids, such as pyrophyllite, talc, chalk, gypsum, fuller's earth, bentonite, attapulgite, and the like. In such operations, the finely divided carrier is ground or mixed with the active compound or wet with a solution of the active compound in a volatile inert organic solvent. Also, such dust compositions when employed as concentrates can be dispersed in water, with or without the aid of dispersing agents to form spray mixtures.

Similarly, the active stimulant products can be compounded with a suitable water-immiscible inert organic liquid and a surface active dispersing agent to produce an emulsifiable concentrate which can be further diluted with water and oil to form spray mixtures in the form of oil-in-water emulsions. In such compositions, the carrier comprises an aqueous emulsion, i.e., a mixture of inert water-immiscible solvent, emulsifying agent and water. Preferred dispersing agents which can be employed in these compositions, are oil-soluble materials including non-ionic emulsifiers such as the condensation products of alkylene oxides with the inorganic acids, polyoxyethylene derivatives or sorbitan esters, complex ether alcohols and the like. Also, oil-soluble ionic emulsifying agents such as mahogany soaps can be used. Suitable inert organic liquids which can be employed in the composition include petroleum oils and distillates, toluene, liquid halohydrocarbons, and synthetic organic oils and vegetable oils. The surface-active dispersing agents are usually employed in liquid composition and in the amount of from about 0.1 to 20 percent by weight of the combined weight of the dispersing agent and active compound.

In addition, other liquid compositions containing the desired amount of effective agent can be prepared by dissolving the active compound in an inert organic liquid such as acetone, methylene chloride, chlorobenzene and petroleum distillates. The preferred inert organic solvent carriers are those which are adapted to accomplish the distribution of the active compound upon the surfaces of the plant or plant part and are of such volatility that they evaporate from the treated plant or plant part having little permanent residue thereon and do not affect plant growth. Particularly desirable carriers are the petroleum distillates boiling almost entirely under 400°F. at atmospheric pressure and having a flash point above 80°F. The proportion of the compounds of this invention employed in a suitable solvent may vary from about 2 to about 50 percent or higher.

As indicated hereinbefore, in application to an area to be treated, the active compound of this invention can be applied by spraying or by the use of mechanical spreaders in accordance with conventional practice. With respect to application, however, it will be noted that, depending upon the particular circumstances encountered, one method of application may be preferable over others.

DESCRIPTION OF THE PREFERRED EMBODIMENTS

In order that the present invention may be more fully understood, the following examples are given to illustrate the manner by which it can be practiced but, as such, should not be construed as limitations upon the overall scope of the same.

EXAMPLE I 2,3,5-Trichloro-6-(methylsulfonyl)-4-cyanopyridine

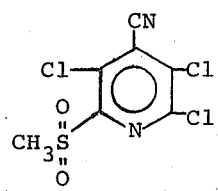

To an agitated solution comprising 200.00 grams (0.59 mole) of 2,3,5-trichloro-4,6-bis(methylsulfonyl)-pyridine (prepared as in Example 6 of U.S. Pat. No. 3,549,647) at 40°C. was slowly added a solution comprising 115.64 grams (2.36 moles) of sodium cyanide in 300 milliliters of water. The temperature was allowed to rise to 85°–90°C. and held at this temperature for 2 minutes. The reaction mixture was cooled quickly to 40°C. and filtered. The crude solid 2,3,5-trichloro-6-(methylsulfonyl)-4-cyanopyridine which precipitated was recovered and dried. The product was recovered in a yield of 87 percent of theoretical. The product had a melting point of 237°C. and was found to have carbon, hydrogen, chlorine, nitrogen and sulfur contents of 29.18, 1.08, 37.12, 9.98 and 11.39 percent, respectively, as compared with the theoretical contents of 29.45, 1.05, 37.20, 9.83 and 11.24 percent, respectively, calculated for the above named compound.

EXAMPLE II

A study was conducted following the practice of the present invention to determine the growth stimulating activity of the compound disclosed in a disease free environment.

An acetone concentrate was prepared by admixing a predetermined amount of 2,3,5-trichloro-6-(methylsulfonyl)-4-cyanopyridine with a predetermined amount of acetone. Five predetermined dilutions were prepared from this concentrate by diluting portions of the concentrate with predetermined amounts of acetone. One-half milliliter aliquots of each dilution were applied to one-half (1/2) ounce seedlots of Sonora wheat seeds. This application procedure results in an equivalent to treating 100 pounds of seeds at a dilution rate of 4, 2, ½, ⅛ and one thirty-second ounce of the active compound. Forty-eight seeds from each treatment were thereafter planted into pots of sterile soil. An additional 144 seeds, were also planted to serve as controls. After planting, the pots containing the seeds were watered and placed in a biochamber at 70–75°F. for about 7 days. The pots were removed and placed in a greenhouse under conditions conducive to good plant growth for about fifteen (15) days. The pots were thereafter examined to determine the average weight of the plants from each treatment. After this test, an additional test was run in a manner identical to the above. The results of these examinations are set forth in Table I.

Table I

| Compound Employed | Dosage of Active Compound Per 100 Pounds of Seeds in Ounces | Average Weight of Plants in Grams Test 1 | Average Weight of Each Plant in Grams Test 2 |
|---|---|---|---|
| 2,3,5-Trichloro-6-(methylsulfonyl)-4-cyanopyridine | 4 | .200 | .242 |
| | 2 | .189 | .222 |
| | ½ | .207 | .204 |
| | ⅛ | .211 | .226 |
| | 1/32 | .220 | .194 |
| Control | — | .165 | .210 |

EXAMPLE III

A study was conducted to determine the fungicidal activity with the compound disclosed.

A test concentrate comprising 50 weight percent 2,3,5-trichloro-6-(methylsulfonyl)-4-cyanopyridine, 42 weight percent Barden clay and 8 weight percent surfactants was prepared. Predetermined amounts of this concentrate composition were mixed with predetermined amounts of water to prepare spray compositions containing 9 to 37 parts of the subject compound per million parts by weight of the ultimate composition. The resulting compositions were sprayed with an atomizing spray nozzle on 2-3 week old tomato plants. The applications were carried out so as to give thorough coverage of all surfaces of the leaves of the plants without appreciable run-off. Following the applications, the spray compositions were allowed to dry upon the leaf surfaces and the plants inoculated by spraying with a suspension of viable spores of *Phytophthora infestans*, a causative agent of late blight. Untreated tomato plants of the same maturity were similarly inoculated to serve as controls. Immediately following the inoculation, all plants were placed in a moist biochamber and maintained at 70°F. under saturated humidity conditions for 24 hours. Thereafter, the plants were placed in a greenhouse under conditions conducive to good plant growth for about 5 days. At the end of this period, the plants were observed to determine the degree of control of late blight as evidenced by the development of lesions of late blight on the leaves of the plants.

Observation of the plants about one week following the inoculations showed a commercially acceptable control level of about 90 percent with the composition containing 9 parts per million of the active compound to a greater than 90 percent control with the composition containing 37 parts per million of the active compound. At the time of the observations, the leaves of all of the untreated control plants were found to be heavily covered with lesions of *Phytophthora infestans*.

EXAMPLE IV

A study was conducted to determine the fungicidal activity with the compound disclosed.

A test concentrate comprising 50 weight percent 2,3-,5-trichloro-6-(methylsulfonyl)-4-cyanopyridine, 42 weight percent Barden clay and 8 weight percent surfactants was prepared. Predetermined amounts of this concentrate composition were mixed with predetermined amounts of water to prepare spray compositions containing from 37 to 150 parts of the subject compound per million parts by weight of the ultimate composition. The resulting compositions were sprayed with an atomizing spray nozzle on 2-3 week old Carignane grape seedlings. The applications were carried out so as to give thorough coverage of all surfaces of the leaves of the plants without appreciable run-off. Following the applications, the spray compositions were allowed to dry upon the leaf surfaces and the plants inoculated by spraying with a suspension of viable spores of *Plasmopara viticola*, a causative agent of grape downy mildew. Untreated grape seedlings of the same maturity were similarly inoculated to serve as controls. Immediately following the inoculation, all plants were placed in a moist biochamber and maintained at 70°F. under saturated humidity conditions for 24 hours. Thereafter, the plants were placed in a greenhouse under conditions conducive to good plant growth for about 5 days. At the end of this period, the plants were observed to determine the degree of control of downy mildew.

Observation of the plants about one week following the inoculations showed a commercially acceptable control level of about 90 percent with the composition containing 37 parts per million of the active compound to a greater than 90 percent control with the composition containing 150 part per million of the active compound. At the time of the observations, all of the untreated control plants were found to be heavily infested with downy mildew.

EXAMPLE V

A study was conducted to determine the fungicidal activity with the compound disclosed.

A test concentrate comprising 50 weight percent 2,3-,5-trichloro-6-(methylsulfonyl)-4-cyanopyridine, 42 weight percent Barden clay and 8 weight percent surfactants was prepared. Predetermined amounts of this concentrate composition were mixed with predetermined amounts of water to prepare spray compositions containing from 37 to 150 parts of the subject compound per million parts by weight of the ultimate composition. The resulting compositions were sprayed with an atomizing spray nozzle on 2-3 week old apple seedlings. The applications were carried out so as to give thorough coverage of all surfaces of the leaves of the plants without appreciable run-off. Following the applications, the spray compositions were allowed to dry upon the leaf surfaces and the plants inoculated by spraying with a conidial suspension of *Venturia inaequalis*, a causative agent of apple scab. Untreated apple seedlings of the same maturity were similarly inoculated to serve as controls. Immediately following the inoculation, all plants were placed in a moist biochamber and maintained at 70°F. under saturated humidity conditions for 24 hours. Thereafter, the plants were placed in a greenhouse under conditions conducive to good plant growth for about 5 days. At the end of this period, the plants were observed to determine the degree of control of apple scab.

Observation of the plants about one week following the inoculations showed a commercially acceptable control level of about 90 percent with the composition containing 37 parts per million of the active compound to a greater than 90 percent control with the composition containing 150 parts per million of the active compound. At the time of the observations, all of the untreated control plants were found to be heavily infested with *Venturia inaequalis*.

EXAMPLE VI

An additional study was conducted to determine the fungicidal activity with the compound disclosed.

A test concentrate comprising 50 weight percent 2,3-,5-trichloro-6-(methylsulfonyl)-4-cyanopyridine, 42 weight percent Barden clay and 8 weight percent surfactants was prepared. Predetermined amounts of this concentrate composition were mixed with predetermined amounts of water to prepare spray compositions containing 37, 150, 600 and 2400 parts of the subject compound per million parts by weight of the ultimate composition. The resulting compositions were sprayed onto the undersides of young grape leaves of Carignane grape seedlings. At the time of spraying the leaves had not yet fully expanded. After treatment, the plants were placed in a greenhouse under conditions conducive for good plant growth for 4 days at which time the leaves had expanded to 3–4 times their original size. The plants were inoculated with a suspension of viable spores of *Plasmopara viticola*, a causative agent of grape downy mildew. At the same time, untreated grape seedlings of the same maturity were inoculated to serve as control. The inoculated plants were placed in a bioclimatic chamber at 65°F. for 3 days, after which time they were placed in a greenhouse under conditions conducive for good plant growth. After 3 days in the greenhouse, they were returned to the bioclimatic chamber for about 24 hours to induce sporulation. At the end of this period, the plants were examined to determine the degree of control of downy mildew using as a criterion the amount of sporulation effects on the leaves. A leaf which is full of sporulated organisms was evaluated as 0 percent control and a leaf which is clear of sporulated organisms was evaluated as 100 percent control. The results of this examination are set forth below in Table II.

Table II

| Compound Applied | Dosage Rate in PPM (a) | Percent Control of Grape Downy Mildew |
| --- | --- | --- |
| 2,3,5-Trichloro-6-(methylsulfonyl)-4-cyanopyridine | 2400 | 99 |
|  | 600 | 100 |
|  | 150 | 95 |
|  | 37 | 35 |
| Control | — | 0 |

(a) dosage rate given in parts of active compound per million parts of the ultimate composition employed

EXAMPLE VII

An additional study was conducted to determine the fungicidal activity with the compound disclosed.

A test concentrate comprising 50 weight percent 2,3,5-trichloro-6-(methylsulfonyl)-4-cyanopyridine, 42 weight percent Barden clay and 8 weight percent surfactants was prepared. Predetermined amounts of this concentrate composition were mixed with predetermined amounts of water to prepare spray compositions containing 19, 75, 300 and 1,200 parts of the subject compound per million parts by weight of the ultimate composition. The resulting compositions were sprayed with an atomizing spray nozzle onto 2–3 week old tomato seedlings. The applications were carried out so as to give thorough coverage of all surfaces of the leaves of the plants without appreciable run-off. Following the applications, the spray compositions were allowed to dry upon the leaf surfaces and the plants inoculated by spraying with a suspension of viable spores of *Phytophthora infestans*, a causative agent of late blight. Untreated tomato seedlings of the same maturity were similarly inoculated to serve as controls. Following inoculation, all plants were placed in a moist biochamber and maintained at 70°F. under saturated humidity conditions for 4 days. At the end of this period, the plants were observed to determine the degree of control of late blight as evidenced by the development of lesions of late blight on the leaves of the plants. The results of this observation are set forth below in Table III.

Table III

| Compound Employed | Dosage Rate in PPM (a) | Percent Control of Late Blight |
| --- | --- | --- |
| 2,3,5-Trichloro-6-(methylsulfonyl)-4-cyanopyridine | 1200 | 100 |
|  | 300 | 99 |
|  | 75 | 97 |
|  | 19 | 97 |

Table III-Continued

| Compound Employed | Dosage Rate in PPM (a) | Percent Control of Late Blight |
| --- | --- | --- |
| Control | — | 0 |

(a) dosage rate given in parts of active compound per million parts of the ultimate composition employed

EXAMPLE VIII

A field study was conducted to determine the fungicidal activity in terms of disease control and fruit yield of the compound disclosed.

A test concentrate comprising 50 weight percent 2,3,5-trichloro-6-(methylsulfonyl)-4-cyanopyridine, 42 weight percent Barden clay and 8 weight percent surfactants was prepared. Serial dilutions were prepared by diluting portions of the concentrate with predetemined amounts of water. Plots containing 60 white potato plants each, growing in soil infected with *Phytophthora infestants*, the causative agent of potato late blight, were treated with aliquotes of the above dilutions in amounts equal to ½ to ¼ pounds of the active chemical per 100 gallons of the ultimate composition in a series of 10 treatments starting on the 26th day after planting with the treatments being on day 26, day 34, day 39, day 46, day 50, day 55, day 60, day 69, day 72 and day 76, all as days after planting. The test compositions were applied as a spray through a spray nozzle operating at 200 pounds pressure with the test compositions being applied in a dosage amount of about 150 gallons per acre. Additional plots were left untreated to serve as controls. Eighty three (83) days after planting, the plots were observed to determine the amount of control of potato late blight and 93 days after planting, the potatoes were harvested and the yield from each treatment determined. The results of these determinations are set forth below in Table IV.

Table IV

| Active Compound Employed | Dosage of Active Compound Pounds per 100 Gallons | Percent of Plants Free of Potato Late Blight | Yield of Potatoes in Pounds |
| --- | --- | --- | --- |
| 2,3,5-Trichloro-6-(methylsulfonyl)-4-cyanopyridine | ½ | 93.3 | 160 |
|  | ¼ | 83.3 | 129 |
| Control | — | 23.3 | 96 |

EXAMPLE IX

A field study was conducted to determine the fungicidal activity in terms of disease control and fruit yield of the compound disclosed.

A test concentrate comprising 50 weight percent 2,3,5-trichloro-6-(methylsulfonyl)-4-cyanopyridine, 42 weight percent Barden clay and 8 weight percent surfactants was prepared. Serial dilutions were prepared by diluting portions of the concentrate with predetermined amounts of water. Plots containing 50 cucumber plants each, growing in soil infected with *Pseudoperonospora cubensis*, the causative agent of cucumber downy mildew, were treated with aliquots of the above dilutions in amounts equal to one-half and one-fourth pounds of the active chemical per 100 gallons of the ultimate composition in a series of 10 treatments starting on the 16th day after planting with the treatments being on day 16, day 22, day 27, day 30, day 34, day 39, day 43, day 48, day 53 and day 58, all as days after planting. The test compositions were applied as a spray through a spray nozzle operating at 200 pounds pressure with the test compositions being applied in a dosage amount of 80 gallons per acre on day 16, 100 gallons per acre on day 22 and about 150 gallons per acre for all additional treatments. Additional plots were left untreated to serve as controls. Sixty-three (63) days after planting, the plots were observed to determine the amount of control of cucumber downy mildew and the cucumbers were thereafter harvested and the yield from each treatment determined. The results of these determinations are set forth below in Table V.

Table V

| Active Compound Employed | Dosage of Active Compound in Pounds Per 100 Gallons | Percent of Plants Infected With Cucumber Downy Mildew | Yield of Cucumber in Pounds |
| --- | --- | --- | --- |
| 2,3,5-Trichloro-6--(methyl-sulfonyl)-4-cyano-pyridine | ½ | 33.3 | 286 |
|  | ¼ | 41.7 | 273 |
| Control | — | 93.3 | 143 |

EXAMPLE X

An additional study was conducted to determine the growth stimulating activity of the compound disclosed in a disease free environment.

A test concentrate comprising 50 weight 2,3,5-trichloro-6-(methylsulfonyl)-4-cyanopyridine, 42 weight percent Barden clay and 8 weight percent surfactants was prepared. Predetermined amounts of this concentrate compositions were mixed with predetermined amounts of water to prepare spray compositions containing 1 and one-half pounds of the subject compound per 100 gallons of the ultimate composition. The resulting compositions were sprayed onto the leaves of Carignane grape plants in field plots in varying numbers of applications during the growing seasons. At the end of the growing seasons the plots were examined and the grape fruit from each treatment as well as from a control treatment, where no test compound was employed, was harvested and weighed. The results of these examinations are set forth below in Table VI.

Table VI

| Compound Employed | Dosage Rate in Pounds of Active Compound Per 100 Gallons of Ultimate Composition | No. of Applications of Composition During Growing Season | Average Yield of Grapes in Pounds per Grape Vine |
| --- | --- | --- | --- |
| 2,3,5-Trichloro-6--(methyl-sulfonyl)-4-cyano-pyridine | 1 | 3 | 23.7 |
|  | 1 | 6 | 25.7 |
|  | 1 | 9 | 29.9 |
|  | 0.5 | 6 | 30.2 |
| Control | — | — | 21.6 |

The subject compound 2,3,5-trichloro-6-(methylsulfonyl)-4-cyanopyridine and its method of preparation is taught in U.S. Pat. No. 3,639,413.

What is claimed is:

1. A method for stimulating plant growth of plants in the presence or absence of fungal organisms which attack the foliar parts of plants which comprises applying to plants or plant parts a fungicidally effective and growth stimulating amount of a composition containing 2,3,5-trichloro-6-(methylsulfonyl)-4-cyanopyridine, as the active fungicide and growth stimulant, in intimate admixture with an inert carrier therefor.

2. The method of claim 1 wherein the composition is applied to plant seeds.

3. The method of claim 1 wherein the composition is applied to plant foliage.

4. The method of claim 2 wherein the composition is applied in an amount sufficient to provide from about one-eighth ounce to about 8 ounces of the active stimulant and fungicide per hundred pounds of seeds.

5. The method of claim 3 wherein the composition is applied in an amount sufficient to provide from about one-half ounce to about 4 pounds of the active stimulant and fungicide per acre.

* * * * *